Feb. 20, 1968  C. E. GIANGIULIO  3,369,582

TOMATO SLICER

Filed May 4, 1967

INVENTOR.
CLAYTON E. GIANGIULIO

BY  *Paul Maleson*

ATTORNEY

United States Patent Office 3,369,582
Patented Feb. 20, 1968

1

3,369,582
TOMATO SLICER
Clayton E. Giangiulio, Skyline Drive, R.D. 2,
Malvern, Pa. 19355
Filed May 4, 1967, Ser. No. 636,176
9 Claims. (Cl. 146—169)

ABSTRACT OF THE DISCLOSURE

An apparatus adapted to slice soft fruit and vegetables and tomatoes in particular. A slidable pusher has a pocket to hold the fruit or vegetables and a number of slots to pass through the blades. A number of thin non-serrated blades are set at or near a preferred angle to the direction of motion of the pusher, and the pusher pocket has sides which intersect the blades within preferred angular limits.

Background of the invention

Slicing machines for many types of food products are of course very well known. Some of these are single bladed, usually using a revolving wheel, and others are multi-bladed. While many food products are easily cut with existing apparatus, the physical characteristics of tomatoes have made it difficult to simultaneously slice a tomato into slices for sandwich use. There is a tendency to crush and mangle the tomato. Much prior apparatus exists which in its rough and general appearance and structure is similar to that of the present invention.

Invention summary

It is an object of this invention to provide a fruit slicing apparatus.

It is another object of this invention to provide a multi-bladed apparatus for slicing soft fruit and vegetables, particularly tomatoes.

It is another object of this invention to provide a slicing apparatus having a pusher, with the pusher comprising a pocket to receive the object to be sliced, and the pocket having arms extending therefrom. The pusher coacts with an array of thin non-serrated blades. The blades are set at an angle to the direction of motion of the pusher of approximately thirty (30) degrees within certain limits. The leading arm of the pocket intersects the blade preferably at an angle slightly less than ninety (90) degrees. The trailing arm of the pocket intersects the blade preferably at a small angle.

The particular shape, structure and arrangement of the pusher and the blade array provide a means whereby the previously experienced problems in simultaneously slicing a tomato into many slices have been obviated. Previous problems include crushing or mangling of the fruit and may also have included the problem of having the fruit slide on the blade rather than be cleanly cut by it. The exact way in which each of the preferable relationships affects the desired clean and non-bruising slicing of a tomato is described in more detail below in connection with the detailed structure and operation of the apparatus.

2

Description of the preferred embodiment

Figure 1:
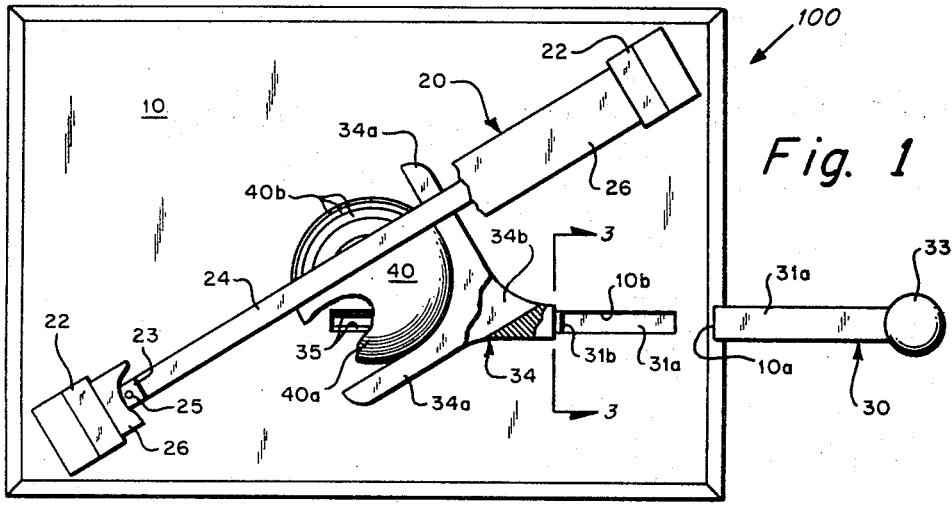
FIGURE 1 is a plan view, partially fragmented, of the soft fruit slicing apparatus.

The invention is best understood in connection with the accompanying figures in which like reference numerals refer to like parts. The soft fruit slicing apparatus is generally designated 100. A generally rectangular base 10 is provided. The base 10 has a generally planar upper surface, generally solid except as described below. It is generally hollow. As shown, the base 10 has a general appearance of an inverted rectangular pan.

The base supports on its upper surface an array of blades. The structure of the blade array or assembly is best initially considered in connection with FIGURE 2. A pair of pedestals or vertical supports 22 are provided extending upwardly from the base. They are affixed to the base by spot welds. The two pedestals are positioned on the upper surface of the base substantially near two diagonally opposed corners. The two pedestals 22 are connected at their upper ends by means of a bridge 26. Bridge 26 serves the function of a blade, and also has the function of bracing apart the two pedestals against the tension stress due to the blades, as is described below. A further subsidiary function of bridge 26 is as a convenient and safe hand rest for the operator during the operation of the apparatus. The pedestals 22 and the bridge 26 are preferably and conveniently made of heavy gauge sheet metal bent so as to form channel members.

Each pedestal 22 has affixed to it a blade retainer 23. The blade retainer 23 is a vertically oriented block of metal, generally of rectangular cross section. These retainers 23 are positioned on their respective pedestals 22 so that they oppose and face each other. Each blade retainer 23 is provided with a plurality of spaced apart horizontal parallel slots, as best shown at the left side of FIGURE 2. These slots extend into the body of the retainer from the side thereof facing the opposed retainer, and do not pass all the way through the body of the retainer. Each slot accommodates the end of a blade 24. Each blade 24 is retained in its slot in each of the opposed blade retainers 23 by means of a vertical pin 25 running through each of the blade retainers 23. A vertical hole to accommodate pin 25 is provided through the center of each of the blade retainers 23. Likewise, a hole is provided near each end of each blade 24. The holes in the retainers and blade ends are so positioned that when each blade 24 is inserted in place as shown, all the holes of one end of all the blades register with the vertical hole through the blade retainer 23 so that pin 25 passes therethrough. The position and structure of pin 25 is best shown at the left hand portion of FIGURE 1, where it is shown below the broken away fragmented portion of bridge 26. This showing at the lower left hand corner of FIGURE 1 of course indicates the position of the corresponding holes in the retainer 23 and the blades 24. An identical structure is provided at the other end, that is, at the upper right hand corner of FIGURE 1.

Each blade is approximately eleven (11) inches long from hole to hole, approximately one-quarter (¼) inch wide, and approximately ten one thousandths (10/1000) inch thick. Thus, each blade is thin and vertically somewhat flexible, although unyielding in a horizontal direction. The blades are shown proportionally thicker in FIGURE 2 for ease of showing. The relative thinness of the blades, on the dimensional order as described above is preferable. It provides less beam strength than a thicker blade would, but it has the advantage of displacing less volume of the tomato, or other fruit object which is passing it. It has been found that this low displacement is important in making the clean cut as desired of an object such as a tomato. The provision of a plurality of such disposed blades for simultaneous cutting is an important aspect of the invention, but the exact number or spacing is subject to reasonable variation. Thus, a preferred form has one quarter (¼) inch spacing between the blades and a total of fifteen (15) blades. Less blades are drawn in FIGURE 2 for ease of showing. Other suitable spacings between the blades include three sixteenths (3/16) inch, three eights (⅜) inch and one half (½) inch. The edge of the blades 24 initially contacted by the object to be cut are sharpened to knife edges, but are not serrated. Serrations have been found to mangle soft fruits or vegetables, particularly tomatoes, which is the specific field of interest of this invention.

The pedestals 22 are affixed to the upper surface of base 10 so that each of the blades 24 is in enough tension to prevent any noticeable or substantial sag in the middle. That is, enough tension is exerted so that to the naked eye, the blades all appear to be substantially horizontal and parallel. The cumulative tension, and the additional stresses when an object is being cut, are one of the requirements for the provision of bridge 26 as has been described above.

The other major element of the apparatus is the pusher assembly. It includes a handle and a pusher. A horizontal longitudinally extended handle generally designated 30 is provided. A grip or knob 33 is affixed to the outer end of this handle. The operator grasps the grip 33 for operation of the apparatus. The handle includes a horizontal portion 31a and an upwardly extending vertical portion 31b. The vertical portion 31b is provided at the inward end of the handle 30, that is, at the end remote from the grip 33.

Figure 3:
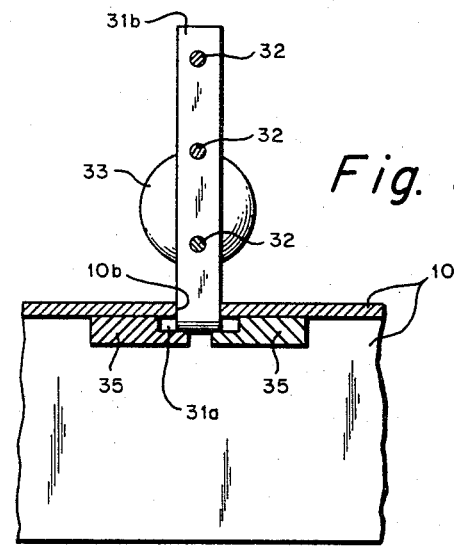
FIGURE 3 is a cross-sectional view taken along line 3—3 of FIGURE 1.

The handle is horizontally slidably movable with respect to the base and parallel to the long edge of the base. An aperture 10a is provided in base 10 in a side thereof closely adjacent the upper surface. This aperture 10a accommodates the horizontal portion 31a of handle 30. The means for providing the sliding motion is best shown in FIGURE 3. Handle guides 35 are provided affixed to base 10 to the bottom of the upper surface thereof, as shown. These guides 35 serve the function of providing an extended passage and a supporting rail below the horizontal portion 31a of the handle. The guides 35 may actually be a unitary member with a central slot extending in a longitudinal direction.

It is also necessary to permit the sliding motion that an aperture 10b be provided to permit the movement of the vertical portion 31a. This aperture 10a is provided in the upper surface of base 10.

The pusher or guide is generally designated 34. Viewed from above is a generally Y-shaped structure, and this horizontal plane shape is carried throughout the vertical extent of the pusher 34. It is affixed to the vertical portion 31b of handle 30 by means of studs or bolts 32 which attach vertical portion 31b to the base of what may be termed the stem portion of the pusher 34. The pusher also includes arms 34a. These are best shown in FIGURE 1 and they branch out from the stem portion.

Figure 2:
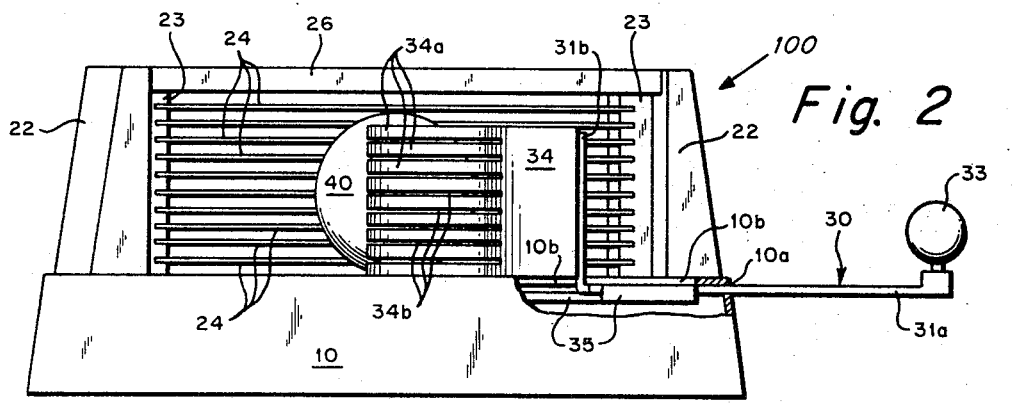
FIGURE 2 is a side view, partially fragmented of the apparatus.

As best shown in FIGURE 2, both arm portions 34a and part of the stem portion are provided with a plurality of spaced horizontal pusher slots 34b. As shown in FIGURE 2, the height of the pusher 34 is equal to the vertical height of the array of blades 24, and one of the pusher slots 34b is provided to register with each of the blades 24. The pusher is preferably made of a strong hard plastic. It has been found that a polycarbonate resin, a thermoplastic material, is satisfactory. A suitable such resin is that sold under the trademark Lexan of the General Electric Co. In FIGURE 1, part of the top of the pusher 34 is fragmented away at the stem portion to show the extent to which the pusher slots 34b extend into the stem portion.

It is apparent that the pusher assembly may be moved by pushing the slidable handle 30 until the pusher 34 has passed through and into the blades 24 to the point where the blades meet the limit of the pusher slots 34b. It is also apparent that the pusher assembly may be withdrawn to the right, as shown in FIGURES 1 and 2, so that a tomato 40, considered as the typical and preferred object to be sliced, may be placed within the ambit of the pusher arms 34a. As best shown in FIGURE 1, the pusher arms join in a smoothly rounded fillet, and the curvilinear portion of the arms and their joint is termed the pocket of the pusher. The tomato 40 is placed on the upper surface of the base 10 in the pocket of the pusher 34. As shown in FIGURE 1, the pusher assembly has been partly moved from right to left so that there is a sliced portion 40b and an unsliced portion 40a of the tomato. The pusher assembly can be retracted to the right so that the entire tomato 40 may be placed within the pocket of the pusher arm 34 without interfering with the blades.

It is highly preferable to observe several geographical relationships between certain of the parts in order to achieve consistent usefulness in slicing tomatoes. There must be a certain amount of movement of the tomato in the direction of the blade rather than a direct pushing into the blade, to provide a slicing type of cutting action. A direct perpendicular contact of the tomato and the blade edge tends to bruise or mangle the tomato and in general be unsatisfactory. The preferred angle between the direction of travel of the pusher assembly and the length of the blades is thirty (30) degrees. A number of different angles have been tried, and it has been found that the preferable range is within ten (10) degrees on either side of this preferred angle. If the angle is greater than that, there is an insufficient slicing effect and the tomato tends to be damaged. If the angle is less, the slicing effect is satisfactory, but the length of the blades would necessarily have to be increased, and the limiting factor in this direction is the loss of beam strength and the loss of stability of alignment of the blades since they would have a long carry with no re-enforcement. Thus, the limitation against a smaller angle is one of engineering and the limitation against the larger angle is one of function.

The arm 34a shown partly through the blade array in FIGURE 1 is the arm of the pusher 34 that enters the blade array first and is referred to as the leading arm. The other arm is called the trailing arm. The angle between the straight portion of the leading arm and the cutting edge of the blades 24 is highly preferable to be slightly less than ninety (90) degrees. A preferred angle has been found to be approximately eighty-seven (87) degrees, and while an absolutely exact limitation cannot critically be established, it can be said that this angle should be more than approximately eighty (80) degrees and less than ninety (90) degrees. The reason is that if this angle is ninety (90) degrees or more, there is tendency to push the tomato along the blades too much rather than to force them into the blades. Such a situation tends to squash, bruise, and otherwise damage the tomato against the blades rather than encouraging the blades to take a smooth entering bite.

It is also highly preferable that a straight portion of the trailing arm of the pusher 34, seen horizontally, be not exactly parallel to the length of the blade 24. The trailing arm makes a small acute angle with the blades, with the apex of the measured angle being toward the pocket end of the arm. This angle insures that the tomato is fully pushed through the blades to the other side. Another and important reason for this angle is to prevent the tomato from tending to roll or be forced backward in a direction along the length of the blades, as the end of the push approaches. That is, it prevents the tomato from tending to slide in a reverse direction from its direction during the major portion of the cut. Such an effect, if not avoided, also tends to mangle the tomato.

It might be thought that the simultaneous multiple slicing of a tomato would not present problems which would require such specific deevlopments, but the tomato presents a frustrating combination of softness and tough skin which does produce the problems which the present invention solves.

Most of the parts of the apparatus 100 are preferably made of heavy gauge bent sheet metal, although other materials and methods of forming may be used. The grip 33 and the pusher 34 are preferably of plastic, although other materials may be used. The base 10 may have distinct legs rather than sides coming down all around to form an apron effect. Rubber feet or suction cups may be provided at the bottom of the base. It has been found desirable to provide interior bracing within the base 10, and an X-frame running from corner to corner close to the upper surface has been found a desirable bracing feature.

The geometrical relationships as described have been obtained in the preferred embodiment by making the angle of separation between the straight portions of the leading and trailing arms 34a greater than ninety (90) degrees, approximately one hundred ten (110) degrees, and by slightly skewing the mounting of the pusher 34 on the vertical portion 31b of the handle. The base of the stem portion of the pusher 34 is not cut perpendicular to the sides of the stem portion, but at an approximate five (5) degree bias, tending to rotate the pusher that amount in the direction of the leading arm.

The scope of this invention is to be determined by the appended claims and not limited to the foregoing description and drawing which are illustrative.

I claim:

1. A tomato slicer comprising a base, an array of blades extending vertically above said base and including a plurality of thin blades with sharp cutting edges in spaced relationship, a pusher assembly mounted on said base, and means to move said pusher assembly and said blades relative to each other in a path of movement, said pusher assembly including a pusher having a leading arm and a trailing arm, said pusher arms forming a tomato holding pocket and having a plurality of slots therein, each slot for reception of a blade of said blade array when said pusher and said blade array are moved relative to each other, said blade array being disposed with respect to said path of movement such that said blade array lies at an angle less than forty (40) degrees with respect to said pusher path of movement, the angle of separation between said pusher leading arm and trailing arm being greater than 90°, the angle between said leading arm and the cutting edge of said blades being less than 90° with the trailing arm of said pusher making a small acute angle with respect to said cutting edge, said last two angles both opening toward the pocket of said pusher, whereby said pusher assembly achieves a smooth shearing action with a tomato urged against and through said blades to secure a plurality of thin tomato slices, essentially undamaged, with said tomato holding pocket slots allowing said blades to pass through the tomato.

2. The invention of claim 1 wherein said pusher assembly is movable and said array of blades is fixed, with said pusher assembly being moved toward and into said blade array in a generally rectilinear path of movement, said blade array lying at an angle ranging aproximately between 20° and 40° with respect to said pusher path of movement, the angle between said leading arm and the cutting edge of said blades being less than 90° and at least approximately 80°.

3. The invention of claim 2 wherein the angle of separation between said pusher leading arm and trailing arm is 110°.

4. The invention of claim 3 wherein the angle between said leading arm and said cutting edge is 87°.

5. The invention of claim 4 wherein the angle between said blade array and said path of movement is 30°.

6. A soft fruit and vegetable slicer comprising
    (a) a base,
    (b) an array of blades on said base, said array being stationary and including a plurality of substantially horizontal parallel elongated flexible thin blades with non-serrated edges in spaced relationship one above the other,
    (c) a pusher assembly mounted on said base, means to provide horizontal rectilinear sliding motion of said pusher assembly with respect to said blade array,
    (d) a pusher included in said pusher assembly, said pusher comprising a leading arm, a trailing arm, and a stem portion, said arms and said stem portion being joined together to form a curvilinear pocket, said pusher having a plurality of slots therein, one such slot being provided for each blade in said blade array and in vertical registration with each said corresponding blade,
    (e) the direction of the elongation of all said elongated blades in said blade array and the direction of said rectilinear sliding motion being an acute angle in a horizontal plane,
    (f) the direction of elongation of said elongated blades with respect to the direction of said rectilinear sliding motion being less than approximately 40°,
    (g) the limit of said rectilinear sliding motion being such that said pusher assembly has a withdrawn position in which said leading arm is at least partly withdrawn from said blade array, and a forward position in which said arm has substantially passed said blade array and said trailing arm has at least closely approached said blade array, the angle between sid leading arm and the direction of said elongated blades in said blade array being less than 90°, and said trailing arm making a small acute angle with the direction of said elongated blades, said angle between said leading arm and the direction of said blades, as well as said small acute angle both opening toward the pocket of said pusher.

7. A soft fruit and vegetable slicer as set forth in claim 6 wherein the angle between the direction of said rectilinear sliding motion and the direction of the elongation of said elongated blades is between approximately 20° and 40°.

8. A tomato slicer comprising a base, an array of blades extending vertically above said base and including a plurality of thin blades with sharp cutting edges in spaced relationship, a pusher assembly mounted on said base, and means to move said pusher assembly and said blades relative to each other in a path of movement, said pusher assembly including a pusher having a leading arm and a trailing arm, said pusher arms forming a tomato holding pocket and having a plurality of slots therein, each slot for reception of a blade of said blade array when said pusher and said blade array are moved relative to each other, said blade array being disposed with respect to said path of movement such that said blade array lies at an angle less than 40° with respect to said pusher path of movement, the angle of separation between said pusher leading arm and trailing arm being greater than 90°, the angle between said leading arm and the cutting edge of said blades being less than 90° with the trailing arm of said pusher making a small acute angle with respect to said cutting edge, said last two-named angles both opening toward the pocket of said pusher, whereby said pusher assembly achieves a smooth shearing action with a tomato urged against and through said blades to secure a plurality of thin tomato slices, essentially undamaged, with said tomato holding pocket slots allowing said baldes to pass through the tomato.

9. The invention of claim 8 wherein the angle between said blade array and said path of movement is 30°, the angle of separation between said pusher leading arm and trailing arm is 110° and the angle between said leading arm and said cutting edge is 87°.

References Cited

UNITED STATES PATENTS

| | | | |
|---|---|---|---|
| 503,903 | 8/1893 | Curtis | 146—169 |
| 1,771,456 | 7/1930 | Alexander | 146—169 |
| 2,082,524 | 6/1937 | Sell | 146—171 |
| 2,323,760 | 7/1943 | Wolfinger | 146—169 |
| 2,483,763 | 10/1949 | Edwards | 146—147 X |
| 2,685,901 | 8/1954 | Putzer | 146—151 |
| 2,792,041 | 5/1957 | Rodel | 146—151 |
| 2,852,053 | 9/1958 | Berry et al. | 146—769 |

W. GRAYDON ABERCROMBIE, *Primary Examiner.*